United States Patent [19]

Ragan

[11] 4,377,038
[45] Mar. 22, 1983

[54] TRUCK WHEEL CLAMP WITH FLOATING SPINDLE PLATE

[75] Inventor: Marshall P. Ragan, Mayflower, Ark.

[73] Assignee: FMC Corporation, Chicago, Ill.

[21] Appl. No.: 235,885

[22] Filed: Feb. 19, 1981

[51] Int. Cl.³ ............................................. G01B 5/255
[52] U.S. Cl. ................................. 33/203.18; 33/288; 33/336; 248/201
[58] Field of Search .......... 33/203.18, 203.19, 203.26, 33/336, 288; 356/155; 248/205 R, 201

[56] References Cited

U.S. PATENT DOCUMENTS

| 1,971,702 | 8/1934 | Burgan | 33/336 |
| 2,325,362 | 7/1943 | Black . | |
| 2,475,502 | 7/1949 | Holmes | 248/201 |
| 3,292,268 | 12/1966 | Knight | 33/336 |
| 3,709,451 | 1/1973 | Grahan . | |
| 3,758,958 | 9/1973 | Jordan . | |
| 3,805,399 | 4/1974 | Price | 33/336 |
| 3,869,798 | 3/1975 | Wilkerson . | |
| 4,011,659 | 3/1977 | Hörvallius . | |
| 4,167,817 | 9/1979 | Hunter | 33/336 |
| 4,185,917 | 1/1980 | Alsina | 33/336 |

Primary Examiner—William D. Martin, Jr.
Attorney, Agent, or Firm—H. M. Stanley; R. B. Megley

[57] ABSTRACT

A wheel clamp is disclosed for supporting a wheel aligning tool in a plane generally parallel to the plane of the wheel. The wheel clamp comprises two assemblies. The first assembly is a clamping frame which grasps the tire at three points along its periphery to provide firm attachment of the clamp to the wheel. The second assembly is a floating frame which actually supports the wheel aligning tool. Three pins extend inward from the floating frame and contact the wheel rim to ensure that the floating frame lies parallel to the plane of the wheel rim. A thumb screw is provided to secure the floating frame to the clamping frame.

6 Claims, 7 Drawing Figures

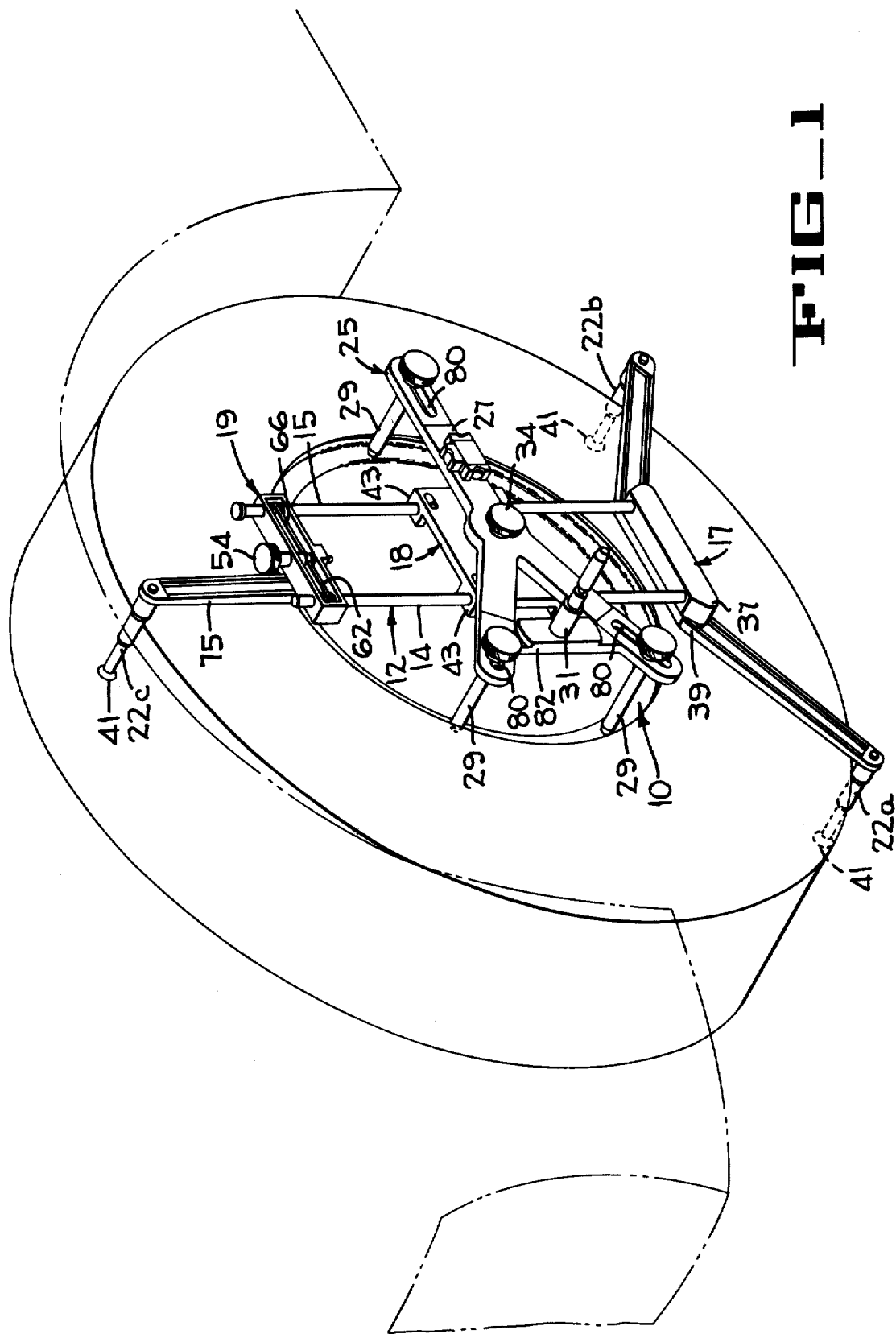

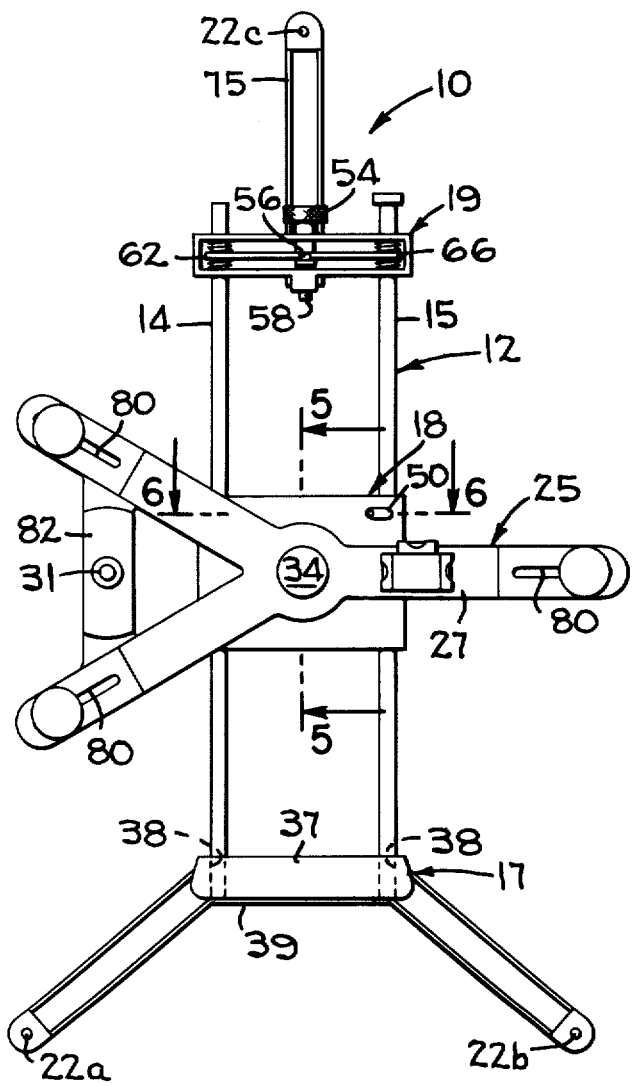
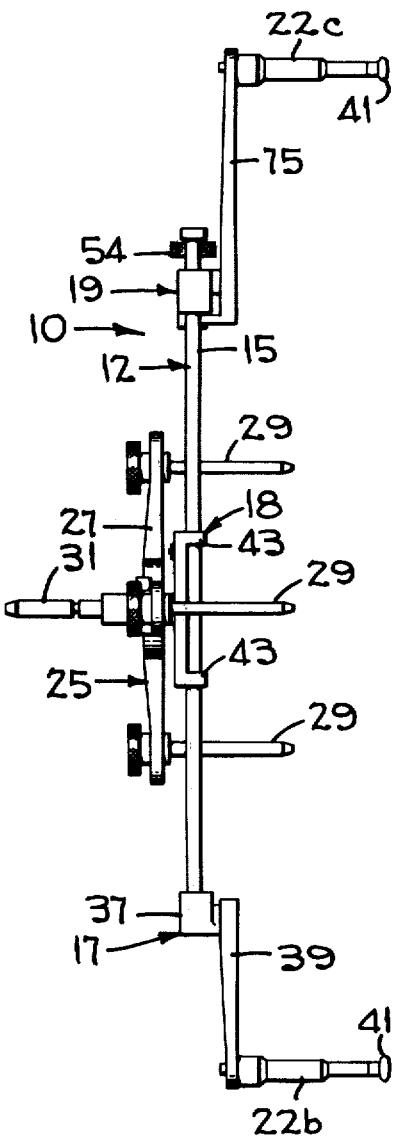
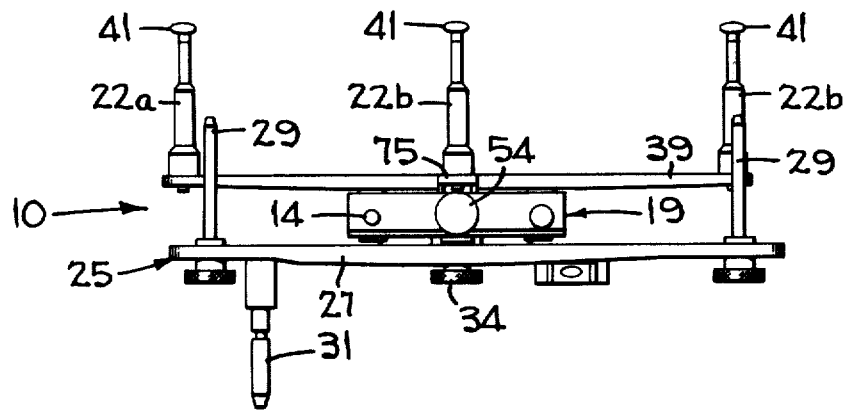

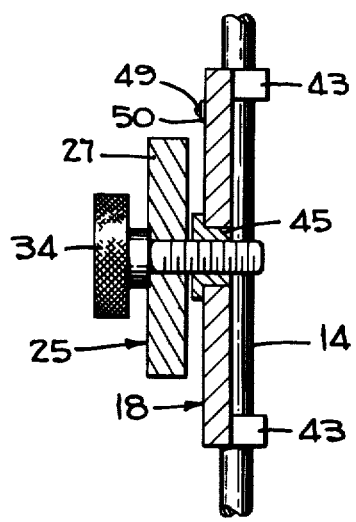
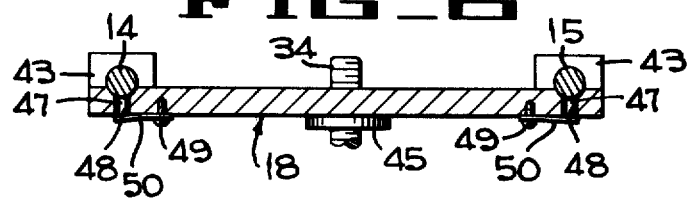
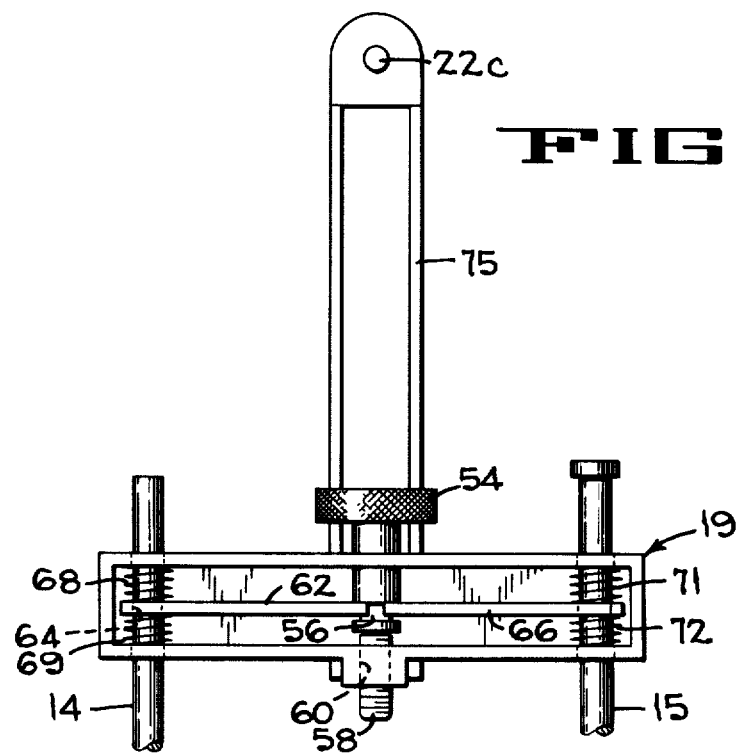

TRUCK WHEEL CLAMP WITH FLOATING SPINDLE PLATE

BACKGROUND OF THE INVENTION

1. Field of the Invention

This invention relates generally to the wheel alignment art and more particularly relates to a wheel clamp which engages a wheel to support a wheel aligning tool in a plane generally parallel to the plane of the wheel rim.

2. Description of the Prior Art

Wheel clamps of varying design have long been used to support a wheel aligning device in a plane parallel to the plane of the wheel rim. Typically, a clamp will have three or four rim-engaging fingers adapted to grasp a peripheral lip extending around the wheel rim and projecting outwardly therefrom. Such a wheel clamp is disclosed in the U.S. Pat. No. 2,475,502, issued on July 5, 1949 to Holmes.

Wheel clamps of the type which grasp the wheel rim, while generally adequate for small diameter automobile wheels, often fail to adhere to the large diameter wheels found on trucks and other heavy duty equipment. As the diameter of the wheel increases, it becomes more difficult to maintain a rigid frame structure, and stress placed on the frame is more likely to remove said frame from the rim. It is therefore desirable to provide a wheel clamp which will attach firmly to the wheel of any diameter and of any configuration.

SUMMARY OF THE INVENTION

The wheel clamp of the present invention is able to both firmly grasp the wheel and provide a parallel support means for the wheel aligning tool by utilizing two separate assemblies. The first assembly is a first frame adapted to grasp the tire rather than the peripheral flange on the wheel rim. By firmly grasping the periphery of the tire at at least three locations, secure attachment of the first frame to the wheel is achieved. A second frame, separate from the first frame and free to move relative thereto, is provided for supporting the wheel aligning tool. Additional means are provided on the second frame for maintaining the plane of the second frame parallel to the plane of the wheel.

In the preferred embodiment of the invention, the means for maintaining the second frame parallel to the plane of the wheel is provided by three spacer pins mounted on the second frame and engaging the wheel rim at three angularly spaced locations. A means is provided for securing the second frame to the first frame so that the second frame can be securely attached to the wheel with all three spacer pins being made to engage the wheel rim simultaneously. In this way, the advantage of securing the wheel clamp to the tire rather than the rim is obtained without sacrificing the requirement of maintaining a parallel relationship between the clamp and the wheel rim.

BRIEF DESCRIPTION OF THE DRAWINGS

FIG. 1 is an isometric view of the wheel clamp of the present invention mounted on a vehicle wheel.

FIG. 2 is a front elevational view of the wheel clamp of the present invention.

FIG. 3 is a side elevational view of the wheel clamp of the present invention.

FIG. 4 is a plan view of the wheel clamp of the present invention.

FIG. 5 is an enlarged, fragmentary section taken along line 5—5 of FIG. 2 and illustrating the means for securing the second frame to the first frame.

FIG. 6 is an enlarged, fragmentary section taken along line 6—6 of FIG. 2 and illustrating the location of the friction buttons.

FIG. 7 is a detail illustrating the clamping mechanism of the upper bracket.

DESCRIPTION OF THE PREFERRED EMBODIMENT

Referrng to FIG. 1, the wheel clamp 10 of the present invention is illustrated mounted on a vehicle wheel. A first frame assembly 12, including two parallel rods 14 and 15, a lower bracket 17, a center bracket 18 and an upper bracket 19, is seen to be held onto the wheel by three tire-engaging fingers 22a, 22b, 22c positioned about the periphery (tread) of the tire. A second frame assembly 25 includes a Y-shaped frame 27, three spacer pins 29, one located on each leg of the Y-shaped frame, and a spindle 31. The second frame assembly is not directly attached to the wheel. Instead, a thumb screw 34 holds the second frame assembly loosely to the first frame assembly. The thumb screw may be tightened in order to engage the spacer pins 29 against the wheel rim and insure that the spindle 31 lies normal to the plane of the wheel rim, as will be described fully hereinafter.

Referring now to FIGS. 2, 3, 4 and 5, the structure on the wheel clamp will be described in detail. The first frame assembly 12 includes a base comprising the first parallel rod 14 and the second parallel rod 15 fixedly mounted in the lower bracket 17. The center bracket 18 and the upper bracket 19 are both slidably received on the parallel rods, as described hereinafter.

The lower bracket 17 comprises a cast body 37 having a hole 38 at each end thereof, said holes each being adapted to fixedly receive one of the parallel rods 14, 15. An extension member 39 is fixed to the rear (closest to the wheel) side of the body 37 and one tire-engaging finger 22a, 22b is mounted on each end of said extension member. The extension member 39 is provided to increase the distance between the two tire-engaging fingers at the lower end of the clamp. While the length of the cast body 37 of the lower bracket itself is approximately 9 inches, the distance between the ends of the extension member is approximately twenty-three inches. By increasing the distance at the base of the first frame assembly, a more secure attachment to the wheel may be achieved.

The tire-engaging fingers 22a, 22b are cylindrical members which are affixed to and extend perpendicularly from the first frame assembly 12 toward the tire. The diameter of the cylinder generally decreases as the distance from the frame increases. At the end of each finger, an elliptical tooth 41 is provided to "bite" into the tire tread when the frame assembly 12 is tightened about the wheel.

The center bracket 18 has a cast body including four slide bearings 43 projecting from the rear and having holes adapted to receive the parallel rods 14, 15 therethrough. The center bracket 18 has a hole at the center thereof adapted to receive a threaded reducer 45 (FIG. 5). The reducer 45, in turn, is adapted to receive the thumb screw 34. The thumb screw attaches the second frame assembly 25 to the first frame assembly 12 by means of a loose fit between the thumb screw 34 and the Y-shaped frame 27 which permits pivotal movement of the frame relative to the thumb screw and thereby permits the second frame to be fixed to the first frame in non-parallel relationship therewith.

A pair of friction buttons 47 (see FIG. 6) are provided to hold the center bracket in place while the wheel clamp is being used. The friction buttons 47 are received through holes 48 (FIG. 6) at the ends of the cast body of the center bracket 18. Each friction button is attached to the face of the bracket by an adjustment screw 49 and a leaf spring 50 which extends between the screw and the friction button. A flat surface on the projecting end of each friction button 47 engages the associated parallel rod (14 or 15) and the resulting friction restricts the free sliding movement of the center bracket on said parallel rods.

The upper bracket 19 consists of a channel-shaped cast body having pairs of vertically aligned holes at each end adapted to receive the parallel rods 14 and 15 (FIGS. 1, 2 and 7). The holes are of sufficient size to enable the upper bracket 19 to slide freely along the parallel rods 14 and 15. A clamping mechanism, including a clamping knob 54, is mounted on the upper bracket 19. The clamping knob includes a depending shaft which has an annular depression 56 about its midsection and a threaded lower end 58 which engages a threaded hole 60 formed in the lower half of the cast body of the upper bracket 19. Clockwise rotation causes the knob 54 to move downward with respect to the cast body, and counterclockwise rotation causes the knob to move upward with respect to the cast body. A first latch member 62, having a circular hole 64 on one end thereof and a semi-circular depression (not shown) on the other end thereof, extends within the cast body of bracket 19 from the first parallel rod 14 to the depending shaft of the clamping knob 54. The semi-circular depression on the latch member is received in the annular depression 56 of the shaft. The circular hole 64 in the latch member is adapted to receive the first parallel rod 14 and has a diameter slightly larger than the diameter of said parallel rod so that the latch is free to slide upon the rod so long as the latch is maintained perpendicular thereto. Similarly, a second latch member 66 extends between the second parallel rod 15 and the depending shaft of the clamping knob 54. The construction of the second latch member is identical to that of the first latch member 62 and will not be described further. The second latch member is disposed between the annular depression 56 on the shaft of the clamping knob 54 and the second parallel rod 15 so that it lies symmetric to the first latch member 62 about the clamping knob 54.

Two springs 68 and 69 lie within one end of the upper clamping bracket 19 and are disposed about the first parallel rod 14. The spring 68 lies above the first latch member 62, and the spring 69 lies below the first latch member. The springs 68 and 69 cooperatively support the outer edge of the first latch member within the cast body in an attitude generally perpendicular to the first parallel rod 14. A similar pair of springs 71 and 72 supports the second latch member 66 in a like manner.

The clamping mechanism of the upper bracket 19 is shown in the "unlatched" configuration in FIG. 7; that is, the latch members 62 and 66 each lie generally perpendicularly to the associated parallel rod. The upper bracket 19 is thus free to move along the parallel rods since the hole at the end of each latch member 62 and 66 has a diameter slightly larger than that of the associated parallel rod. Rotation of the clamping knob 54 in the counterclockwise direction will raise the depending shaft to which the latch members are attached and cause the latch members to cant against the associated parallel rods and lock the upper bracket in a fixed position on the rods.

An extension arm 75 is firmly attached to the rear of the cast body of the upper bracket 19. A rim engaging finger 22c, similar to the fingers 22a and 22b is attached to the distal end of the extension arm 75 and projects perpendicularly from the plane of the first frame assembly. The three rim engaging fingers 22a, 22b and 22c lie parallel to one another and act cooperatively to engage the tire tread at three points well spaced from each other.

The first frame assembly 12 is mounted on the wheel by manually lifting the frame assembly to the wheel and placing the lower tire-engaging fingers 22a, 22b against the tire tread. With the clamping mechanism of the upper bracket 19 in its unlatched configuration, the upper bracket 19 may be moved upwardly so that the third tire-engaging finger 22c is placed over the top of the tire. After the upper bracket 19 has then been moved downwardly until all three tire-engaging fingers are in firm contact with the tire tread, the first frame assembly 12 may be firmly mounted on the wheel by turning the clamping knob 54 in a counterclockwise direction. Such rotation moves the clamping knob 54 and its depending shaft upwardly relative to the body of the bracket 19, thus forcing the inner ends of the latched members 62 and 66 upwardly and thereby cocking both latch members relative to the parallel rods 14 and 15. The holes in the latch members through which the parallel rods 14 and 15 extend are sized to be just large enough so that when the latch members 62 and 66 are cocked, they bind against each of the parallel rods. Movement of the latch members 62 and 66 along the rods is thereby prevented. Further rotation of the clamping knob 54 in the counterclockwise direction causes the upper bracket 19 to move downward relative to both the latch members 62 and 66 and the parallel rods 14 and 15 and against the resistance of springs 68 and 71 (FIG. 7). This downward motion, in turn, causes the three tire-engaging fingers 22a, 22b, 22c to constrict around the periphery of the tire and to bite into the relatively soft tire tread, resulting in a firm attachment thereto. The clamping knob 54 may be rotated in the opposite (clockwise) direction in order to release such attachment. The clamping mechanism of the preferred embodiment is described in greater detail in the copending application of Marshall P. Ragan, U.S. Ser. No. 112,764, filed on Jan. 17, 1980.

The second frame assembly 25 mounts onto the center bracket 18 of the first frame assembly 12 by means of the thumb screw 34. The Y-shaped frame 27 of the second frame assembly 25 has three legs of approximately the same length. The Y-shaped frame 27 has a hole adapted to receive the thumb screw 34 at the point where the three legs meet to form the Y (FIG. 5) with the hole being slightly larger in diameter than the diameter of the thumb screw to that the frame 27 can pivot about the axis of the thumb screw. Each leg of frame 27 has an elongate slot 80 near the distal end thereof adapted to receive a single spacer pin 29. The spacer pins may be fastened at any point along the elongate slot 80, depending on the diameter of the wheel rim encountered, but for any given wheel rim each of the pins will be fastened in the identical position along its associated slot. The spindle 31 projects forwardly from the Y- shaped frame 27 and is mounted directly on a crossmember 82 suspended between two legs of the frame.

The thumb screw 34 should be loosened prior to mounting the first frame assembly 12 on the wheel. In this way, the spacer pins 29 of the second frame assembly 25 will not engage the wheel rim while the first frame assembly is being mounted. After mounting the first frame assembly, the position of the center sliding bracket 18 should be adjusted until the thumb screw 34 is generally aligned with the axis of the wheel. Next, the radial positions of the three spacer pins 29 should be adjusted so that they will fall on the outermost shoulder of the wheel rim when the thumb screw 34 is subsequently tightened. Note that the spacer pins each project precisely the same distance beyond the Y-shaped frame 27. Finally, the thumb screw 34 should be tightened until each of the spacer pins 29 engages the wheel rim. This may require the tilting of the frame 27 about the axis of the thumb screw 34 if the first frame assembly is not mounted parallel to the plane of the wheel. In any case, it will be appreciated that the plane of the Y-shaped frame 27 now lies parallel to the plane of the wheel rim. Since the spindle 31 lies perpendicular to the plane of the Y-shaped frame, it will also lie perpendicular to the plane of the wheel rim in the proper position to accommodate a conventional wheel alignment measuring device which can be pendulously mounted thereon.

Although the best mode contemplated for carrying out the present invention has been herein shown and described, it will be apparent that modification and variation may be made without departing from that which is regarded to be the subject matter of the invention.

What is claimed is:

1. A wheel clamp for supporting a wheel aligning tool in a plane parallel to the plane of a wheel, said wheel including both a tire and a rim, comprising:

a first frame;

means attached to the first frame for firmly grasping the periphery of the tire;

a second frame for supporting the wheel aligning tool;

means attached to the second frame for maintaining the plane of said second frame parallel to the plane of the wheel, whereby the aligning tool is supported in a plane parallel to the plane of the wheel; and means for permitting pivotal movement of the second frame into non-parallel relationship with said first frame and for securing the second frame thereafter in fixed position relative to the first frame when the second frame is in said plane parallel to the plane of the wheel.

2. A wheel clamp for supporting a wheel aligning tool in a plane parallel to the plane of a wheel, said wheel including both a tire and a rim, comprising:

a first frame;

means attached to the first frame for firmly grasping the periphery of the tire;

a second frame for supporting the wheel aligning tool, said second frame being free to move relative to the first frame;

three spacer pins attached to the second frame which engage the wheel rim at angularly spaced positions for maintaining the plane of said second frame parallel to the plane of the wheel, whereby the aligning tool is supported in a plane parallel to the plane of the wheel; and means for securing the second frame to the first frame when the second frame is in said plane parallel to the plane of the wheel.

3. The wheel clamp as in claim 2, wherein said pins are adjustably mounted on the second frame so as to accommodate wheel rims of different diameter.

4. A wheel clamp for supporting a wheel aligning tool in a plane parallel to the plane of a wheel, said wheel including both a tire and a rim, comprising:

a first frame;

three tire-engaging fingers attached to the first frame;

means for constricting the three tire-engaging fingers about the periphery of the tire, whereby the first frame can be secured to the wheel;

a second frame for supporting the wheel aligning tool, said second frame being free to pivot relative to the first frame;

three spacer pins mounted on the second frame for engaging the wheel rim, whereby the plane of the second frame can be maintained parallel to the plane of the wheel; and means for rigidly securing the second frame to the first frame when all three spacer pins engage the wheel rim simultaneously.

5. A wheel clamp as in claim 4, wherein the position of each of the three spacer pins upon the second frame is adjustable to accommodate wheel rims of different diameters.

6. A wheel clamp as in claim 4, wherein the means for securing the second frame to the first frame is a thumb screw arranged to be threaded into said first frame and being received through a slightly oversized aperture in said second frame.

* * * * *